(12) United States Patent
Brown et al.

(10) Patent No.: US 8,706,329 B2
(45) Date of Patent: Apr. 22, 2014

(54) FACILITATING NAVIGATION OF VESSELS IN SPECIFIC WATER ENVIRONMENTS

(75) Inventors: Ross Brown, Portland, OR (US); Tim Sukle, Parker, CO (US); John Horner, Portland, OR (US); Rodi Von Barby, Morrison, CO (US)

(73) Assignee: The Boeing Company, Chicago, IL (US)

( * ) Notice: Subject to any disclaimer, the term of this patent is extended or adjusted under 35 U.S.C. 154(b) by 1429 days.

(21) Appl. No.: 11/706,477

(22) Filed: Feb. 15, 2007

(65) Prior Publication Data

US 2008/0201029 A1 Aug. 21, 2008

(51) Int. Cl.
*B60L 3/00* (2006.01)

(52) U.S. Cl.
USPC .......................................... 701/21

(58) Field of Classification Search
USPC ........... 701/21, 200, 400, 408–410, 412, 532, 701/533; 440/1; 340/990, 995.1; 342/64
See application file for complete search history.

(56) References Cited

U.S. PATENT DOCUMENTS

| | | | |
|---|---|---|---|
| 4,590,569 A | 5/1986 | Rogoff et al. | |
| 4,939,661 A * | 7/1990 | Barker et al. | 701/200 |
| 5,754,429 A | 5/1998 | Ishihara et al. | |
| 5,916,284 A * | 6/1999 | Ishihara et al. | 701/21 |
| H1878 H * | 10/2000 | Greer et al. | 342/357.52 |
| 2002/0055872 A1 * | 5/2002 | LaBrie et al. | 705/14 |
| 2004/0165749 A1 * | 8/2004 | Holz et al. | 382/104 |
| 2005/0090971 A1 | 4/2005 | Bulatao et al. | |
| 2006/0064242 A1 * | 3/2006 | Litvack et al. | 701/202 |
| 2006/0210007 A1 * | 9/2006 | Koskelo et al. | 376/156 |

FOREIGN PATENT DOCUMENTS

| | | |
|---|---|---|
| DE | 19813005 A1 | 10/1999 |
| EP | 1365301 A2 | 11/2003 |

OTHER PUBLICATIONS

Captain Nick Nash, Pilotage spreadsheet dated May 24, 2003.

* cited by examiner

*Primary Examiner* — John Q Nguyen
*Assistant Examiner* — Rodney P King
(74) *Attorney, Agent, or Firm* — Harness, Dickey & Pierce, P.L.C.

(57) ABSTRACT

A method of facilitating movement of a vessel in a specific navigation environment. Characteristics of the vessel are evaluated relative to conditions in the environment to define a navigation procedure. The procedure is described on a navigational chart that includes information from sources of navigation-related experience, e.g., sovereign governmental authorities, hydrographic offices, port authorities, communication authorities, vessel masters, operators and port pilots. The vessel is indicated as geographically referenced to points in the environment indicative of successive positioning of the vessel in accordance with the procedure. Using such procedures can streamline coordination among masters, operators and ports and can shorten time needed to plan and perform navigation in complex environments.

28 Claims, 5 Drawing Sheets

FACILITATING NAVIGATION OF VESSELS IN SPECIFIC WATER ENVIRONMENTS

FIELD

The present disclosure relates generally to vessel navigation and more particularly to facilitating navigation of ships, boats and other vessels in environments such as ports, bays, load/unload facilities, sounds and rivers.

BACKGROUND

The statements in this section merely provide background information related to the present disclosure and may not constitute prior art.

Navigation of vessels in water environments such as ports, bays, sounds and rivers can be highly complex due, for example, to variations in current, winds, water depth, weather, and structures and/or obstacles in and/or under the water. Vessel characteristics such as size, draft and speed capability also can vary from one vessel to another. Additionally, a navigator may be required to observe port-specific policies imposed, for example, by a port authority or vessel operator, while at the same time adhering to shipping company policies and procedures. Thus a vessel's master may be required to cooperate with a port pilot who may take over control of the vessel during navigation through particular areas. It can be seen that the foregoing considerations tend to be highly specific to a given navigation environment and to a given vessel.

SUMMARY

In one implementation, the present disclosure is directed to a method of providing information to facilitate movement of a vessel in a specific navigation environment. A plurality of characteristics related to the vessel are evaluated relative to a plurality of conditions pertaining to the environment. Based on the evaluating, one or more procedures are defined for navigating the vessel relative to the environment. One of the procedure(s) is described on one or more navigational charts in which at least part of the environment is indicated to scale. The vessel is indicated as geographically referenced in the chart(s) to a plurality of points in the environment, the points indicative of successive positioning of the vessel relative to the environment in accordance with the described procedure.

In another implementation, the disclosure is directed to a method of providing information to facilitate movement of a specific vessel in a specific navigation environment. A plurality of characteristics of the vessel are evaluated relative to a plurality of conditions pertaining to the environment. Based on the evaluating, a course is defined for navigating the vessel relative to the environment. The method includes indicating, on one or more navigational charts in which at least part of the environment is indicated to scale, successive positions of the vessel along and geographically referenced to the course; and providing guidance information specific to the environment on the one or more navigational charts, at least some of the information being provided in a progression relative to the successive positioning of the vessel.

In another implementation, the disclosure is directed to a system for providing information to facilitate movement of a vessel in a navigation environment. The system includes means for representing in a navigation chart: (a) at least part of a specific environment to scale and (b) a procedure for navigating the vessel relative to the specific environment, the procedure including a recommended course geographically identified relative to the specific environment. The system also includes means for geographically locating one or more points of the vessel during navigation, and means for indicating in the navigation chart, based on the one or more geographically located vessel points, at least part of an outline of the vessel, substantially in real time, and relative to the specific environment and recommended course.

In still another implementation, the disclosure is directed to a method of facilitating navigation of one or more vessels in a specific environment. For each of the vessel(s), one or more procedures are obtained for navigating the vessel relative to the environment, the procedure(s) defined using data relating to a plurality of characteristics of the vessel and data relating to a plurality of conditions of the environment. For one of the vessel(s), at least one of the obtained procedure(s) is accessed via one or more navigational charts. An indication of the one of the vessel(s) in the chart(s) is used to facilitate navigation, the indication relative to the environment and relative to a course recommended in the procedure being accessed.

In yet another implementation, the disclosure is directed to a system for facilitating movement of one or more vessels in a specific environment. The system includes at least one processor and memory configured to, for each vessel, represent the vessel in substantially real time in at least one navigational chart relative to the environment and relative to a course recommended in a procedure for navigating the vessel relative to the environment. The procedure is described in the at least one chart and defined using data relating to a plurality of characteristics related to the vessel and data relating to a plurality of conditions pertaining the environment.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

The following description is merely exemplary in nature and is not intended to limit the present disclosure, application, or uses.

In various implementations of the disclosure, navigational procedural information may be provided on one or more navigational charts. The procedural information may be specific to a particular vessel and/or vessel type and specific to a particular environment. Such charts may be printed and/or electronically displayed. Such a navigation chart may be generated, e.g., in substantially real time from a data-driven environment based on variable parameters available at the instant of chart generation. A chart may be displayed, e.g., on a portable electronic device. Other or additional devices and display media also are contemplated, including but not limited to non-portable devices and/or display media.

Figure 1:
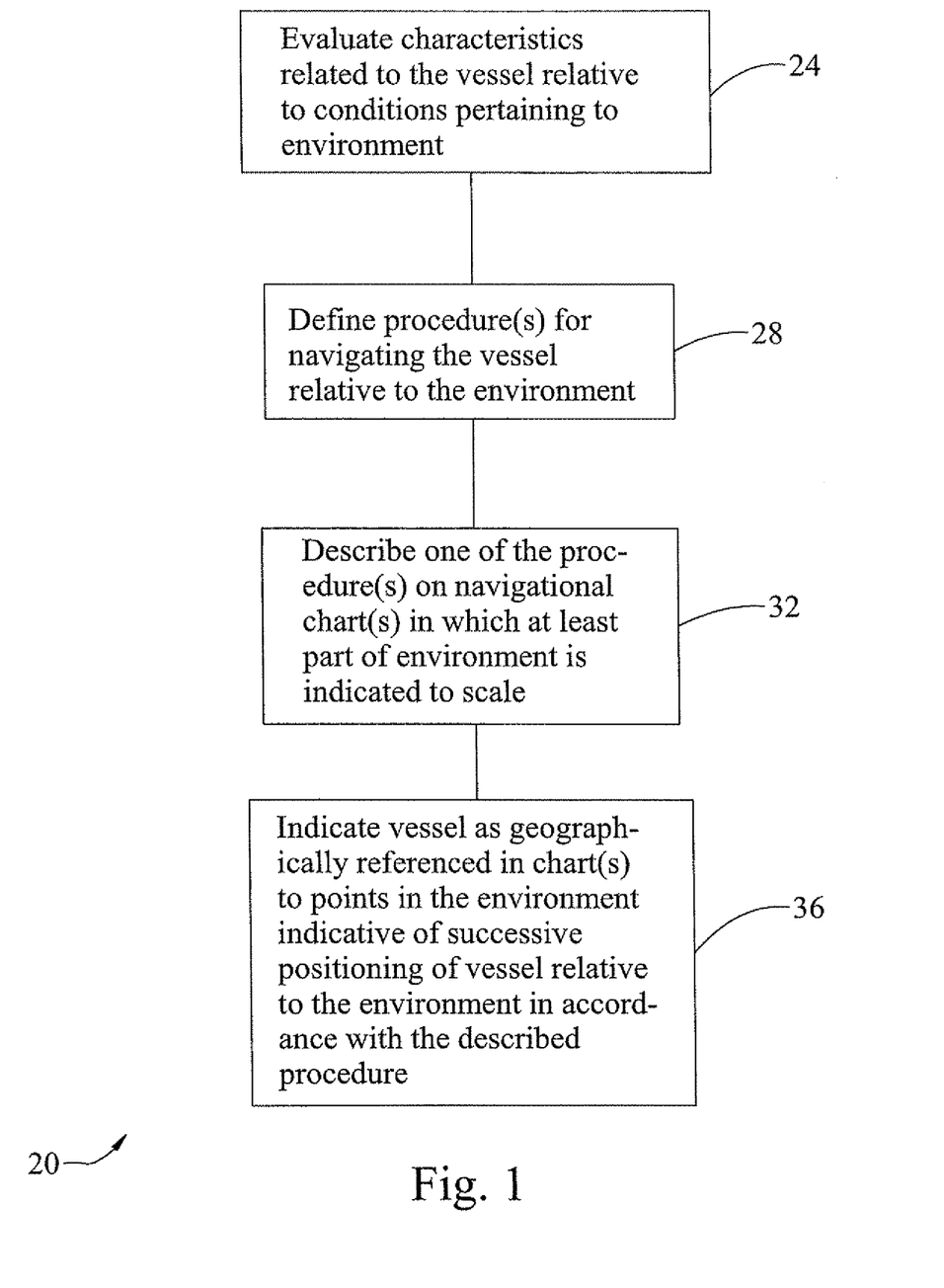
FIG. 1 is a flow diagram of a method of providing information to facilitate movement of a vessel in a specific navigation environment in accordance with one implementation of the disclosure.

One implementation of a method of providing information to facilitate movement of a vessel in a specific navigation environment is indicated generally in FIG. 1 by reference number 20. The environment may be, for example, a specific port and/or a specific river. It should be understood, however, that the present disclosure could be implemented in relation to various water environments in which a specific navigation procedure could be useful, including but not limited to locks, bridges, company-specific equipment (such as oil rigs), load/unload facilities, etc.

It can be appropriate to navigate different vessels in different ways in the same environment. It will be appreciated, for example, that a navigation procedure appropriate for one vessel in a space-constricted environment may not be appropriate for a larger vessel navigating in the same environment. Additionally, it can be appropriate to navigate a vessel in the same environment in different ways dependent, e.g., on weather, other environmental conditions, presence of specific precision navigation equipment onboard or onshore, and/or company-specific practices and/or policies. Such policies could include but would not necessarily be limited to safety margins to be observed by vessel crews. Thus, for example, a navigation procedure for a vessel during high tide may not be appropriate for the same vessel during low tide in the same environment.

Referring again to FIG. 1, in operation 24 of the method 20, a plurality of characteristics relating to the vessel are evaluated relative to a plurality of conditions pertaining to the environment. Conditions pertaining to an environment may include, e.g., water depths, locations of structures and/or obstacles, current speeds and directions, wind speeds and directions, presence of fog, rain, local conditions, use of tug-assist (or not), etc. Characteristics relating to a vessel may include, e.g., physical characteristics such as all or part of a profile of the vessel, vessel height, draft of the vessel, speed capability, rudder positioning, equipment of the vessel, etc. Characteristics relating to a vessel may also include crew-related characteristics, e.g., training capability of a vessel crew, and/or operator-related characteristics, e.g., an operator-specific policy pertaining to a vessel.

It should be noted that a wide variety of conditions pertaining to an environment and a wide variety of characteristics related to a vessel are possible, and that such conditions and/or characteristics can vary dependent on the vessel and/or the environment. It should be noted further that a condition pertaining to an environment could overlap with or be the same as a characteristic related to a vessel. Thus, for example, where an operator policy specifies an action to be taken by a crew of a particular class of vessel while a vessel of that class is berthing in a specific port location, that policy may be considered as a condition pertaining to an environment and/or as a vessel-related characteristic.

Referring again to FIG. 1, in operation 28, based on the evaluating, one or more procedures are defined for navigating the vessel relative to the environment. As further described below, such a procedure may include a recommended course for the vessel to follow during navigation. In operation 32, one of the procedure(s) is described on one or more navigational charts in which at least part of the environment is indicated to scale. In operation 36, the vessel is indicated as geographically referenced to a plurality of points in the environment. The points are indicative of successive positioning of the vessel relative to the environment in accordance with the described procedure. In some implementations, the vessel is indicated to scale in a chart. Indicating a vessel to scale tends to be useful, e.g., in charts displaying a small area in which the vessel is being maneuvered. In other implementations, it may be advantageous to indicate the vessel at other than scale. Thus, for example, where an environment shown in a chart is very large compared to the actual size of a vessel, the vessel may be shown as larger than at scale, in order to be visible on the chart. A vessel may be indicated at different scales in different charts, for example, where a procedure is described in a series of navigational charts as further described below.

It should be noted that a procedure may be defined as specific to a particular vessel type or class and/or specific to one or more vessel-related characteristics. Such characteristics could include, for example, vessel equipment configuration and/or training capability of the crews. Thus one vessel of a particular group of vessels, e.g., operated by the same vessel operator, could be navigated in accordance with a procedure specific to that group. It also should be noted that a procedure may be defined as specific to a particular, individual vessel.

Figure 2:
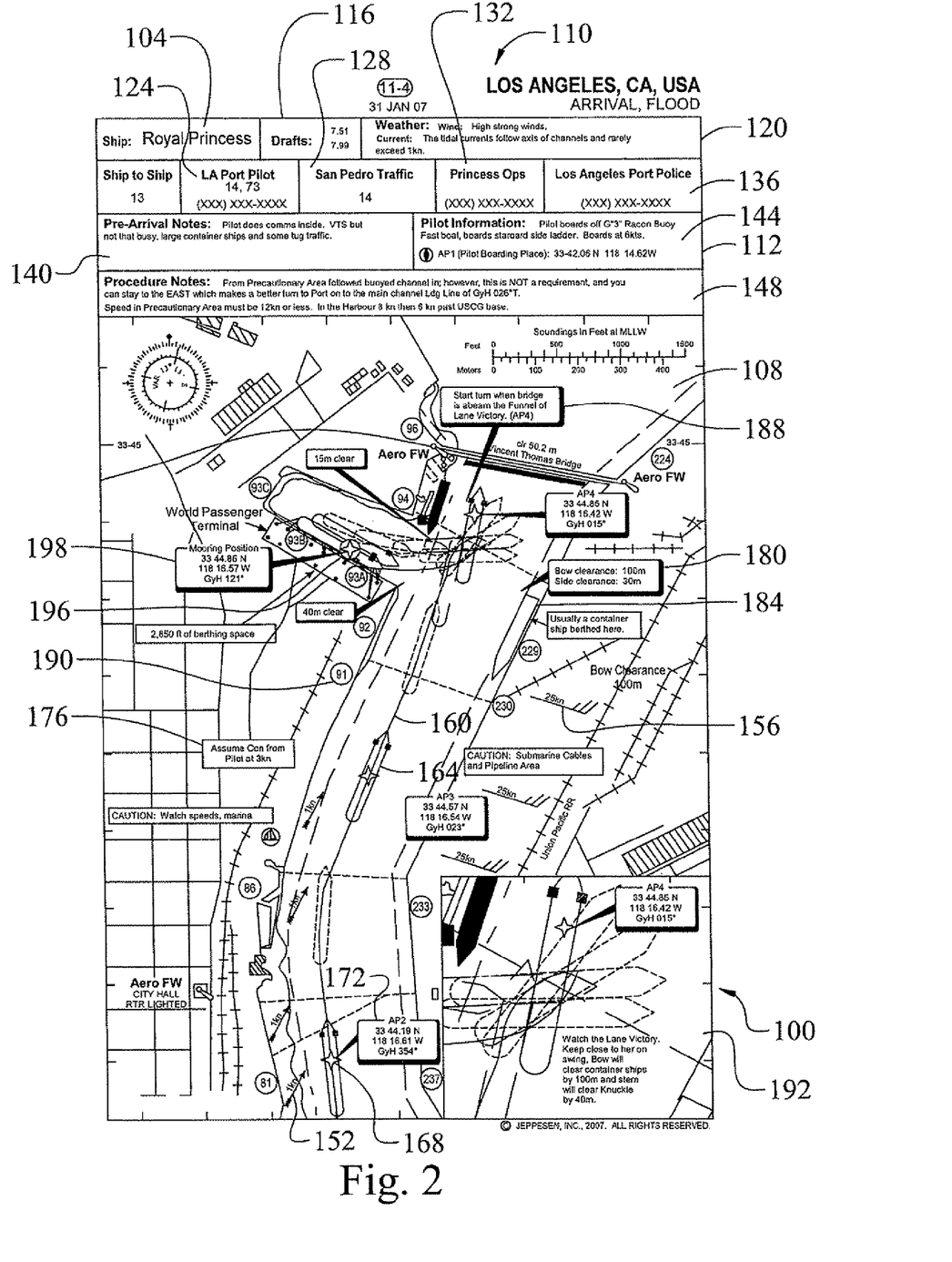
FIG. 2 is an illustration of a printed navigational chart in accordance with one implementation of the disclosure.

One implementation of a printed navigational chart is indicated generally in FIG. 2 by reference number 100. The chart 100 is for use in navigating a specific vessel and/or vessel type 104 as the vessel arrives in a specific environment 108, i.e., the port of Los Angeles, Calif., USA, under specific conditions, i.e., flood tide conditions. An index area 110 indicates, e.g., the vessel and/or vessel type and whether the chart is for arrival or departure. The chart 100 includes, in an informational area 112, various items of information useful in a navigation procedure, e.g., drafts 116 of the vessel 104 as empty and at full load, and weather conditions 120 under which it may be appropriate to use the chart 100. Contact information is provided for port pilot 124, traffic 128, vessel operator 132, and port police 136. Additional information provided in the chart 100 includes pre-arrival notes 140, pilot information 144, and procedure notes 148.

Information items 140, 144 and 148, as well as other items of information on the chart 100 further described below, may be provided by one or more sources of navigation-related experience relative, e.g., to the port of Los Angeles. Such information may be obtained, for example, from a ship master, including but not limited to master of the ship 104, who has navigated in the port of Los Angeles. In such manner, a vessel operator may preserve knowledge of senior captains, e.g., for sharing and use within the vessel operation. Additionally or alternatively, such information may be obtained from a port pilot, local harbor master and/or other person at the port authority for Los Angeles, and/or from a vessel operator, including but not limited to an operator of the vessel 104. In such manner, a vessel operator may implement port-specific policies by providing port-specific instructions to masters of its vessels.

The environment 108, including various landmarks, is indicated to scale in the chart 100. Arrows 152 indicating water current directions and speeds and flags 156 indicating wind directions and speeds are overlaid on the environment 108. The chart 100 includes a recommended course 160 for the vessel 104. An outline 164 of the vessel 104 is also indicated to scale and repeated along the recommended course in the chart 100. Although the course 160 is indicated as a line in the chart 100, a course could be indicated in other or additional ways. For example, a course could be shown as a lane in which it is recommended that a vessel remain during navigation.

Vessel outlines 164 may be shown in dashed lines, e.g., to indicate turning and/or maneuvering. Solid lines may be used in the outlines 164, e.g., to indicate steady heading. A plurality of approach points 168 are shown which are indicative of successive positioning of the vessel 104 along the recommended course 160. In various implementations, the vessel 104 uses a satellite navigation system during navigation. Such systems can include but are not limited to the Global Positioning System (GPS), Galileo, etc. Accordingly, each approach point 168 is geographically identified on the chart 100 by coordinates 172, thereby providing geographical guidance to the vessel 104 during navigation.

A progression of information is provided relative to the successive positioning of the vessel 104. For example, a block 176 includes an instruction to assume control of the vessel from a port pilot at a speed of 3 knots. A block 180 includes an instruction to clear a container ship 184 by 30 meters. Near an approach point AP4, a block 188 indicates when to start turning the vessel 104. In an inset 192, the approach point AP4 is enlarged and additional instructions are provided for avoiding nearby ships while turning at AP4. A mooring point 196 also is identified by geographical coordinates 198. Circled numbers 190 indicate various port facilities.

It should be noted that in other charts depicting the same environment, navigation information provided in blocks and/or informational areas may vary dependent, e.g., on environment conditions and on a direction in which a vessel is to be navigated. For example, another implementation of a printed navigational chart is indicated generally in FIG. 3 by reference number 200. The chart 200 is for use in navigating the vessel 104 as it departs from the port of Los Angeles, Calif., USA, under specific conditions, i.e., ebb tide conditions. The chart 200 includes, in an informational area 204, various items of information useful in a navigation procedure, e.g., drafts 208 of the vessel 104 and weather conditions 212 under which it may be appropriate to use the chart 200. An index area 214 indicates, e.g., the vessel and/or vessel type and whether the chart is for arrival or departure. Contact information is provided for port pilot 216, traffic 220, vessel operator 224, and port police 228. Additional information provided in the chart 200 includes pre-departure notes 232, pilot information 236, and procedure notes 240.

Figure 3:
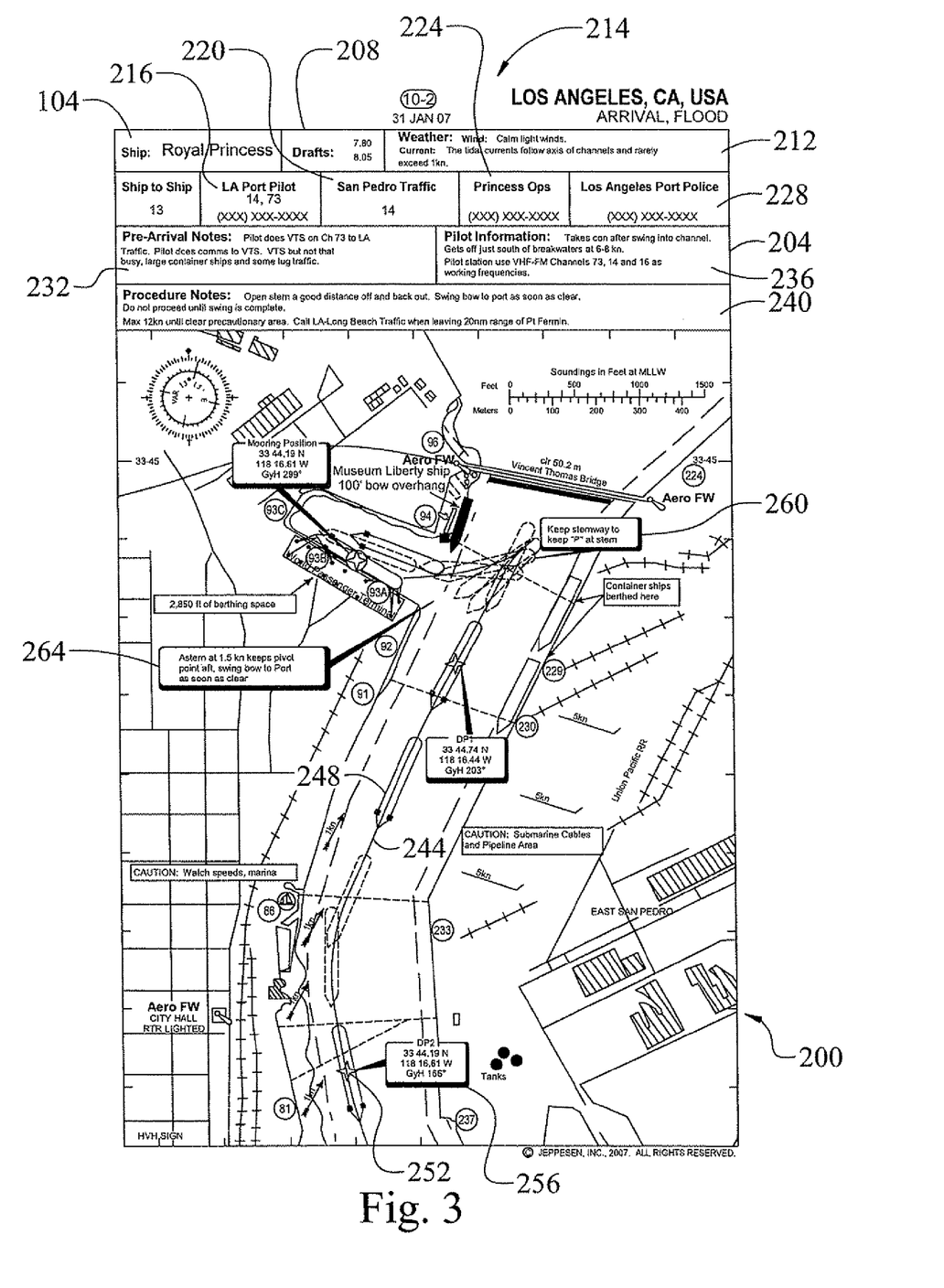
FIG. 3 is an illustration of a printed navigational chart in accordance with one implementation of the disclosure.

It should be noted that the index area 214 could be used in other or additional ways, to indicate, e.g., the port or other environment in which the chart is to be used, environmental and/or other conditions, that particular berthing options are to used, etc. It should be noted generally that an indexing system based, e.g., on various conditions to be taken into account in procedures described in charts could be used to coordinate access to and use of such charts. Such an indexing system could be used to coordinate the use of a navigation procedure, e.g., in a port and on board a vessel, and/or between a vessel and a vessel traffic system (VTS).

Information items 232, 236 and 240, as well as other items of information on the chart 200 further described below, may be provided by one or more sources of navigation-related experience relative to the port of Los Angeles. Such information may be obtained, for example, from a ship master, including but not limited to master of the ship 104, who has navigated in the port of Los Angeles. Additionally or alternatively, such information may be obtained from a Los Angeles port pilot, harbor master and/or other person at the port authority for Los Angeles, and/or from a vessel operator, including but not limited to an operator of the vessel 104. In such manner, a vessel operator may implement port-specific policies by providing port-specific instructions to masters of its vessels. It should also be noted that unique procedures could be charted for the same port facility based, e.g., on individual needs of different operators. In some implementations relating to river environments, different procedures may be used dependent on current conditions. For example, a procedure for navigating through a narrow, fast current flow pattern may be different from a procedure for navigating through a slower, wider flow pattern.

The environment 108, including various landmarks, is indicated to scale in the chart 200. The chart 200 includes a recommended course 244 for the vessel 104. An outline 248 of the vessel 104 is also indicated to scale and repeated along the recommended course in the chart 200. A plurality of departure points 252 are shown which are indicative of successive positioning of the vessel 104 along the recommended course 244. Each departure point 252 is geographically identified by coordinates 256, thereby providing geographical guidance to the vessel 104 during navigation. In various implementations in relation to river environments, mile marks may be used instead of, or in addition to, global positioning coordinates. In implementations in which a recommended course is defined as a lane, departure points or other geographically identified waypoints may be provided on either or both sides of the lane to indicate the lane.

A progression of information is provided relative to the successive positioning of the vessel 104. For example, a block 260 includes an instruction to keep the vessel sternway to keep a pivot point "P" at the stern, that is, to maneuver the vessel in a way to pivot around the point P toward the vessel stern. A block 264 states: "Astern at 1.5 knots keeps pivot point aft, swing bow to Port as soon as clear". It should be noted that a vessel may move sideways. Accordingly, in various implementations, sideways movement may be indicated in a chart by repeated vessel outlines. Additionally or alternatively, in procedures for use in relation to a vessel in combination with a tug or barge, a combined outline may be indicated on a chart.

Figure 4:
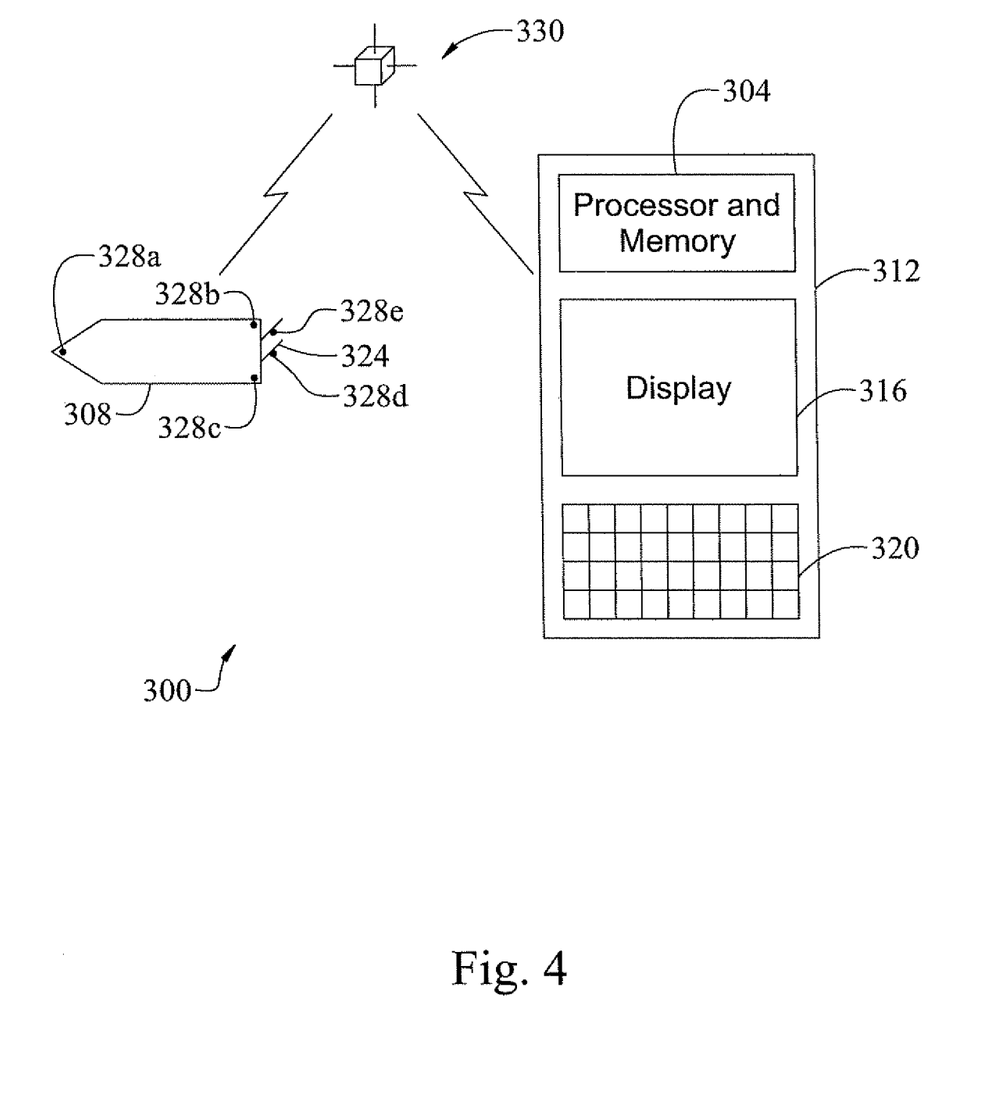
FIG. 4 is a diagram of a system for facilitating movement of one or more vessels in a specific navigation environment in accordance with one implementation of the disclosure.

In some implementations in which an electronic navigation chart is provided, the satellite navigation system may be used to geographically identify various points on a vessel. For example, one implementation of a system for facilitating navigation of one or more vessels in a specific environment is indicated generally in FIG. 4 by reference number 300. The system 300 includes at least one processor and associated memory 304. One processor/memory 304 is shown in FIG. 4. The system 300 also includes one or more vessels 308, one of which is shown in FIG. 4. A processor/memory 304 may be located on board the vessel 308. In the implementation shown in FIG. 4, the processor and memory 304 are included in a charting device 312 that is portable and thus may be carried and referred to, e.g., by the vessel master during navigation of the vessel. As shown in FIG. 4, the charting device 312 includes a display 316 on which, e.g., a chart may be shown, and a user input device, e.g., a keyboard 320.

In some implementations, a processor/memory 304 may be remote from a display 316 and/or input device 320. It is contemplated that teachings of the disclosure could be implemented by various entities to coordinate vessel navigation. Accordingly, it is contemplated that such entities as port authorities, harbor authorities, vessel traffic systems, etc., may obtain, display and/or utilize various navigation procedures via navigation charts using charting devices such as the device 312. It should be understood that many different combinations, locations, and degrees of portability of processor(s), memory, display(s) and user input device(s) are possible.

The vessel 308 includes rudders 324. Points 328a-328e on the vessel 308 may be tracked by a satellite navigation system 330. Coordinates of the tracked points may be used by the processor and memory 304 to provide an overlay image of the vessel 308 at a desired scale on a navigation chart, in substantially real time. Thus the chart can be used to display substantially real-time movement of the vessel 308 during navigation, e.g., along a recommended course displayed in the chart.

Figure 5:
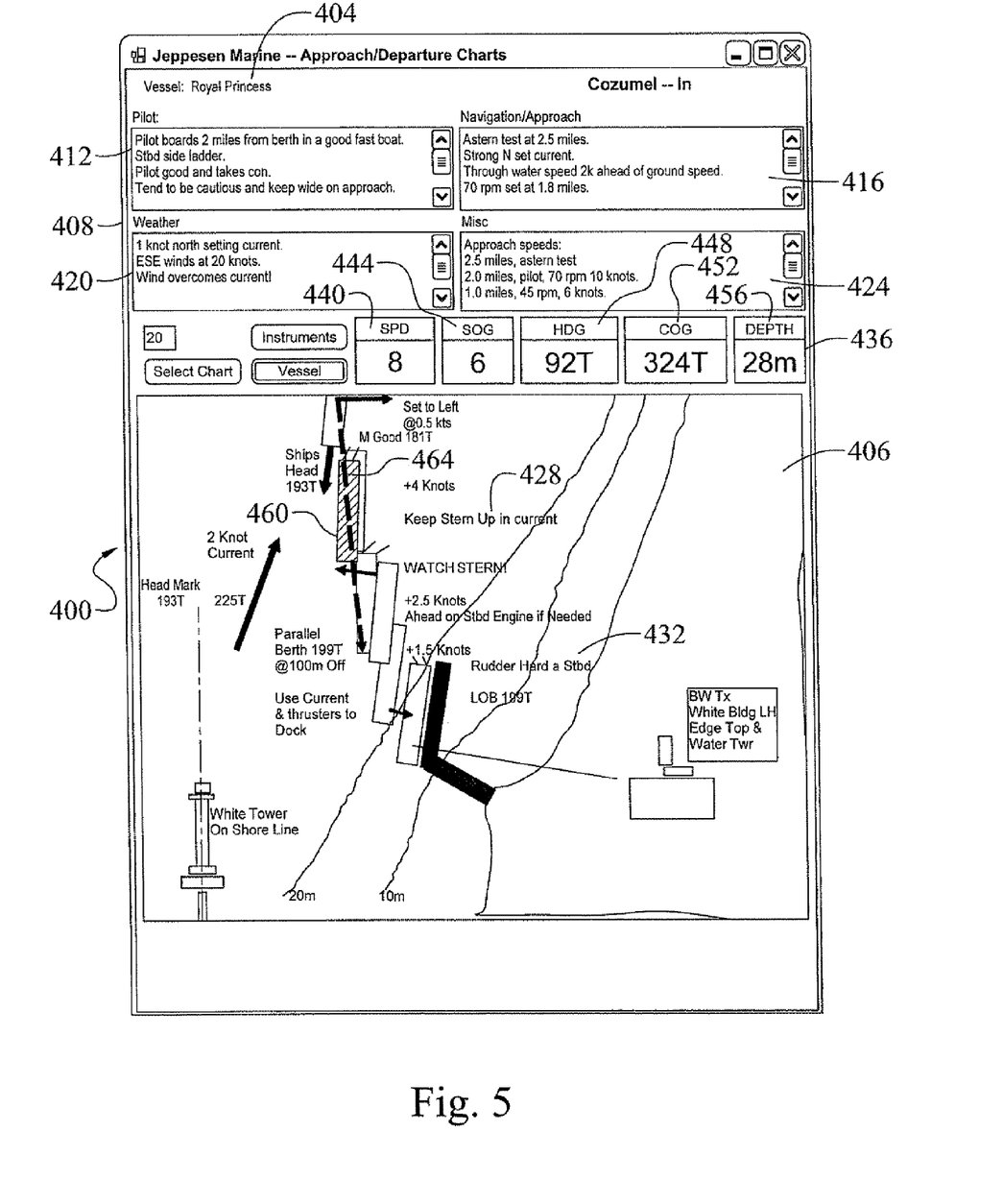
FIG. 5 is an illustration of an electronic navigational chart in accordance with one implementation of the disclosure.

One implementation of an electronic chart is indicated generally in FIG. 5 by reference number 400. The chart 400 describes a procedure for a specific vessel 404 for arriving in a specific environment 406, i.e., Cozumel, Mexico. An informational area 408 includes pilot information 412, navigation/approach information 416, weather information 420, and miscellaneous information 424. Informational area 408 information, as well as other items of information on the chart 400, may be provided by one or more sources of navigation-related experience relative to Cozumel. Such information may be obtained, for example, from a ship master, including but not limited to master of the ship 404, who has navigated in the Cozumel area. Additionally or alternatively, such information may be obtained from a Cozumel port pilot and/or other authority at Cozumel, and/or from a vessel operator, including but not limited to an operator of the vessel 404. Generally, sources of navigation-related experience may include sovereign sources including but not limited to port authorities.

On the chart 400 one or more instructions 428 may be overlaid onto the environment 406. The instructions 428 are progressively arranged in accordance with successive positioning of the vessel 404. It can be useful to include vessel-specific instructions, e.g., from the vessel master as to particular actions to be taken in operating parts and equipment of the vessel. Thus, for example, the procedure includes an instruction 432 to rudder hard at starboard.

A user may cause conning data 436 from the vessel's instruments to be displayed on the chart 400. Thus, for example, vessel speed 440, speed over ground (SOG) 444, heading information 448, course over ground (COG) 452, and sensed water depth 456 may be displayed during navigation. Additionally or alternatively, the user may cause an overlay image 460 of the vessel 404 to be displayed, in substantially real time, to scale on the navigation chart 400. Thus the chart 400 can be used to display substantially real-time movement of the vessel 404 during navigation, e.g., relative to a recommended course 464 displayed in the chart. In some implementations, in the event of a variance of a vessel from a procedure, e.g., if the vessel varies from a recommended course, an appropriate indicator may be displayed on the chart. For example, conning data such as vessel speed 440 and/or heading information 448 may be displayed in a green color, unless the vessel varies from a recommended speed and/or heading. In such case, the vessel speed 440 and/or heading information 448 may be displayed in a red color for so long as the variance continues. As another example, an actual location of the vessel may be displayed in a green color, unless the vessel strays from a recommended course. In such case, the actual location of the vessel may be displayed in a red color, e.g., for so long as the vessel continues apart from the course. Of course, other colors and/or indicator types and durations could be used, e.g., to alert a vessel master during navigation.

It should be noted that information on the chart 400 may vary based, e.g., on actual location of the vessel 404 and based on relevancy of the information. For example, in some implementations an instruction 428 may be displayed temporarily as a "pop-up" overlay that disappears when the vessel no longer is in a position for which the particular instruction may be relevant. In such manner, the chart may be kept clear of clutter while relatively important information may be given prominence. In various implementations, a standard set of symbols and formats are used in the charts, to promote understanding and ease of chart use and thereby facilitate navigation and coordination of navigation-related activities.

Specific navigation procedures can be provided in accordance with implementations of the disclosure for individual vessels, vessel types and/or individual environments, for specific times of the year, for specific operators, and for various other or additional conditions such as fog, tides and traffic. In some implementations, a procedure may be included in a series of charts. For example, an arrival chart series may begin with an area chart in which one or more arrival areas are shown. An approach chart may show a procedure for navigating in an arrival area to a point at which a more specific arrival procedure would be used. An arrival chart may show a final procedure to dock at a specific location. Conversely, a departure chart series may include an inverse set of charts and/or procedures.

The foregoing methods and systems make it possible for navigators, port authorities, vessel operators and others to utilize valuable information from vessel masters, pilots, operators and others who have first-hand knowledge of local conditions in specific navigational environments. Defining navigation procedures in accordance with the foregoing methods and systems makes it possible to incorporate notes and instructions deemed important by operators, pilots, vessel masters, and port authorities into the same navigation procedure. Using such procedures can streamline coordination among masters, operators and ports and can shorten time needed to plan and perform navigation in complex environments.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of providing information to facilitate movement and operation of a vessel in a specific navigation environment, the method comprising:

evaluating a plurality of characteristics related to the vessel relative to a plurality of conditions pertaining to the environment;

based on the evaluating, defining one or more procedures for operating and navigating the vessel relative to the environment;

describing one of the one or more operating and navigating procedures on one or more electronically generated navigational charts in which at least part of the environment is indicated to scale;

using a processor to indicate the vessel as geographically referenced in the one or more electronically generated charts to a plurality of points in the environment, the points indicative of successive orientations and positions of the vessel relative to the environment in accordance with the described procedure, and wherein each of the points has associated therewith latitude and longitude position values, and wherein at least one of the points also provides a heading that the vessel is to follow when reaching the at least one point;

wherein indicating the vessel comprises indicating the vessel by a series of graphics, drawn to scale in relation to the environment, on at least one of the one or more electronically generated charts; and wherein at least one textual instruction is provided on the at least one of the one or more navigation charts that provides additional explanation to a vessel operator as to how the vessel operator is to operate the vessel, at a specific one of the points, to thus orientate the vessel relative to structure located in the environment, before the vessel proceeds to a subsequent one of the points.

2. The method of claim 1, wherein describing one of the one or more procedures comprises providing a progression of information on the one or more navigational charts for use in navigating and operating the vessel, the progression of information provided relative to the successive positioning of the vessel.

3. The method of claim 1, wherein the conditions pertaining to the environment include at least one of the following: weather, current, water depth, operator policy specifying an action to be taken by a crew of the vessel, offshore equipment, navigation equipment on-board the vessel, and structure location in the environment.

4. The method of claim 1, wherein the environment includes at least one of the following: a port, a lock, a river, a load/unload facility, and a navigable waterway.

5. The method of claim 1, wherein the one or more navigational charts are electronically displayed on a visual display screen.

6. The method of claim 1, further comprising:
obtaining navigation guidance information specific to the environment from one or more sources of navigation-related experience relative to the environment; and
incorporating the guidance information into at least one of the one or more procedures.

7. The method of claim 1, wherein the characteristics related to the vessel include at least one of the following: a physical characteristic of the vessel, a profile of the vessel, a position of a rudder of the vessel, a height of the vessel, a draft of the vessel, equipment of the vessel, a crew-related characteristic of the vessel, and an operator policy to be followed by a crew of the vessel, and an operator-related characteristic of the vessel.

8. The method of claim 1, further comprising selectively indicating, based on a direction of the vessel, one or more of the conditions pertaining to the environment.

9. The method of claim 1, further comprising:
geographically locating one or more approach points in the environment; and
indicating the vessel in the one or more electronically generated charts relative to the one or more approach points.

10. A method of providing information to facilitate at least one of arrival or departure of a specific vessel in a specific navigation environment, the method comprising:
evaluating a plurality of characteristics of the vessel relative to a plurality of conditions pertaining to the environment;
based on the evaluating, defining a course for navigating the vessel relative to the environment;
using a processor to indicate, on one or more electronically generated navigational charts in which at least part of the environment is indicated to scale, successive positions of the vessel along and geographically referenced to the course; and
providing guidance information specific to the environment on the one or more electronically generated navigational charts, at least some of the information being provided in a progression relative to the successive positioning of the vessel;

wherein the vessel is indicated by a series of graphics drawn approximately to scale in at least one of the one or more electronically generated charts;
wherein the generated charts include a plurality of guidance points which are indicative of successive positioning of the vessel along the defined course, with at least some of said guidance points including a longitude value, a latitude value, and a heading that the vessel is to assume when reaching a specific one of the guidance points;
and wherein at least one textual instruction is provided on the at least one of the one or more electronically generated navigation charts, that provides additional instruction to an operator of the vessel as to how the operator is to control a speed of the vessel while executing an operational procedure at a specific one of the guidance points, to carry out a specific navigation maneuver for the vessel, and in order to orientate the vessel relative to structure in the environment, before the vessel proceeds to a next successive one of the guidance points.

11. The method of claim 10, further comprising indicating successive positions of the vessel in combination with another vessel.

12. The method of claim 10, wherein at least one of the characteristics of the vessel is specific to a class of vessel.

13. The method of claim 10, wherein at least one of the characteristics of the vessel is specific to the vessel.

14. A system for providing information to facilitate movement of a vessel in a navigation environment, the system comprising:
means for representing in a navigation chart: (a) at least part of a specific environment to scale and (b) a procedure for navigating the vessel relative to the specific environment, the procedure including a recommended course geographically identified relative to the specific environment;
means for geographically locating one or more points of the vessel during navigation;
means for indicating in the navigation chart, based on the one or more geographically located vessel points, a graphical representation of at least part of an outline of the vessel which is taken from an overhead perspective of the navigation environment, and where the graphical representation of the vessel is drawn to scale in relation to the specific environment and the recommended course, and substantially in real time;
wherein the navigation chart includes guidance information including a plurality of guidance points which are indicative of successive positioning of the vessel along the recommended course, with at least some of the guidance points including a longitude value, a latitude value and a heading; and
wherein the navigation chart further includes at least one textual instruction that provides additional explanation to an operator of the vessel as to how the operator is to control positioning of a bow or stern of the vessel, at a specific one of the guidance points, in order to orientate the vessel relative to structure present in the environment, before the vessel proceeds to a next successive one of the guidance points.

15. The system of claim 14, wherein the displaying means comprises means for selectively overlaying the guidance information relative to the environment in the chart.

16. The system of claim 14, wherein the guidance points comprise approach points;

wherein the system further comprises means for geographically locating the approach points in the environment; and means for indicating at least part of the vessel outline relative to the approach points.

17. The system of claim 16, further comprising means for indicating a variance of the vessel from a path formed by the approach points.

18. A method of facilitating navigation of one or more vessels in a port, harbor or dock environment, the method comprising:

obtaining, for each of the one or more vessels, one or more procedures for navigating the vessel relative to the environment, the one or more procedures defined using data relating to a plurality of characteristics of the vessel and data relating to a plurality of conditions of the environment;

for one of the one or more vessels, accessing at least one of the one or more obtained procedures via one or more navigational charts;

using an indication of the one of the one or more vessels in the one or more charts to facilitate navigation, the indication being relative to the environment and relative to a course recommended in the procedure being accessed, and the one or more vessels being represented by a plurality of graphics drawn to scale in relation to the environment, the graphics being at spaced apart points along the course;

wherein the one or more navigation charts includes a plurality of guidance points which are indicative of successive positioning of the one or more vessels along the course with at least one of the guidance points including a longitude value, a latitude value and a heading that the vessel is to assume when reaching the at least one of the guidance points; and wherein the one or more navigation charts further include at least one textual instruction that provides additional explanation to an operator of a specific one of the one or more vessels as to how orientate at least one of the bow or stern of the specific one of the vessels, at a specific one of the guidance points, in order to orientate the specific one of the vessels relative to structure present in the environment before the vessel proceeds to a next successive one of the guidance points.

19. The method of claim 18, wherein the one of the one or more vessels is indicated in the one or more charts in substantially real time.

20. The method of claim 18, wherein the data relating to a plurality of conditions of the environment includes environment-specific navigation guidance information from one or more sources of navigation-related experience relative to the environment.

21. The method of claim 18, wherein the vessel operator may include at least one of the following: a vessel master, a tug operator, a vessel ground crew, a vessel traffic authority, and an environment authority.

22. The method of claim 21, wherein the environment includes a port and the environment authority includes a port authority.

23. The method of claim 18, wherein accessing a procedure comprises using an index system to select one of the charts.

24. A system for facilitating movement of one or more vessels in a dock, harbor or port environment, the system comprising at least one processor and memory configured to:

for each vessel, represent the vessel, in substantially real time, in at least one navigational chart relative to the environment and relative to a course recommended in a procedure for navigating the vessel relative to the environment, the procedure described in the at least one chart and defined using data relating to a plurality of characteristics related to the vessel and data relating to a plurality of conditions pertaining the environment, and the vessel being represented by a series of graphics in the chart that, where the graphics are drawn to scale in relation to the environment, to thus represent the specific environment from an overhead perspective;

wherein the at least one chart includes a plurality of guidance points which are indicative of successive positioning of the vessel along the course, with at least one of the guidance points including a longitude value, a latitude value and a heading that the vessel is to assume when reaching the at least one of the guidance points; and wherein the at least one navigation chart further includes at least one textual instruction that provides additional explanation to a vessel operator as to how to control a speed of the vessel, while simultaneously controlling pivoting motion of the vessel, at a specific one of the guidance points, in order to orientate the vessel in a predetermined manner relative to structure present in the environment, before proceeding to a next successive one of the guidance points.

25. The system of claim 24, wherein the data comprises at least one of the following: environment-specific navigation guidance information and vessel-related guidance information.

26. The system of claim 24, the at least one processor and memory further configured to also make the at least one navigational chart available to at least one of the following: a vessel master, the vessel operator, a tug operator, a vessel ground crew, a vessel traffic system authority, and an environment authority.

27. A method of providing information to facilitate movement of a marine vessel in at least one of a port, harbor or dock environment, the method comprising:

evaluating a plurality of characteristics related to the vessel relative to a plurality of conditions pertaining to the port, harbor or dock environment;

defining one or more procedures for navigating the vessel relative to the port, harbor or dock environment;

describing one of the one or more procedures on one or more charts which include one or more diagrams of the procedure; and indicating the vessel as geographically referenced in the one or more charts to a plurality of points in the port, harbor or dock environment in accordance with the described procedure; wherein the describing the one or more procedures includes indicating a speed at which at least one of the one or more procedures is to be carried out at, at a specific one of the plurality of points; and wherein the one or more charts further include at least one textual instruction that provides additional explanation to a vessel operator as to how the vessel operator is to operate the vessel, at a specific one of the points, to thus orientate the vessel relative to the port, harbor or dock environment, before preceding to a next successive one of the guidance points wherein the describing the one or more procedures includes indicating a speed at which at least one of the one or more procedures is to be carried out at, at a specific one of the plurality of points.

28. A method of providing information to facilitate movement of a vessel into or out of a harbor, dock or port, the method comprising:

evaluating a plurality of characteristics related to the vessel relative to a plurality of conditions pertaining to the harbor, dock or port;

based on the evaluating, defining one or more procedures for navigating the vessel relative to the harbor, dock or port;

describing one of the one or more procedures on one or more navigational charts in which at least part of the dock or port is indicated to scale, the procedures including textual instructions to explain specific navigation maneuvers to assist with at least one of entering or exiting the harbor, the dock or the port; and indicating the vessel as geographically referenced in the one or more charts to a plurality of points in the harbor, dock or port, the points indicative of successive positioning of the vessel relative to the harbor, dock or port in accordance with the described procedure.

* * * * *